United States Patent [19]

Urquhart

[11] 4,048,975
[45] Sept. 20, 1977

[54] PISTONS

[75] Inventor: William James Urquhart, Tumbi Umbi, Australia

[73] Assignee: F. B. J. Engineering Services Pty. Limited, Granville, Australia

[21] Appl. No.: 631,213

[22] Filed: Nov. 12, 1975

[30] Foreign Application Priority Data

Nov. 13, 1974 Australia .................................. 75328

[51] Int. Cl.² ............................................ F01B 31/10
[52] U.S. Cl. .................................. 123/193 P; 92/158
[58] Field of Search .............. 123/193 P; 92/158, 159, 92/162

[56] References Cited

U.S. PATENT DOCUMENTS

| 980,597 | 1/1911 | Campbell | 92/158 X |
|---|---|---|---|
| 1,360,498 | 11/1920 | Chandlee | 92/158 |
| 2,438,243 | 3/1948 | Zoromskis | 92/158 |
| 3,035,879 | 5/1962 | Hanny et al. | 92/162 R X |

FOREIGN PATENT DOCUMENTS 752,329  7/1956  United Kingdom .................. 92/158

*Primary Examiner*—Carroll B. Dority, Jr.
*Assistant Examiner*—Craig R. Feinberg

[57] ABSTRACT

A piston such as is used in internal combustion engines, steam engines, gas engines, air engines, pumps, compressors and the like from which the usual piston rings are absent the sealing of the piston being affected by means of right and left hand intersecting helical channels formed on a portion of the surface of the piston wall.

It is preferred that the helical channels terminate at each end in a circumfcrential groove. The sealing is effected by means of oil trapped by the channels between the piston wall and a cylinder in which the piston operates.

1 Claim, 1 Drawing Figure

U.S. Patent  Sept. 20, 1977  4,048,975
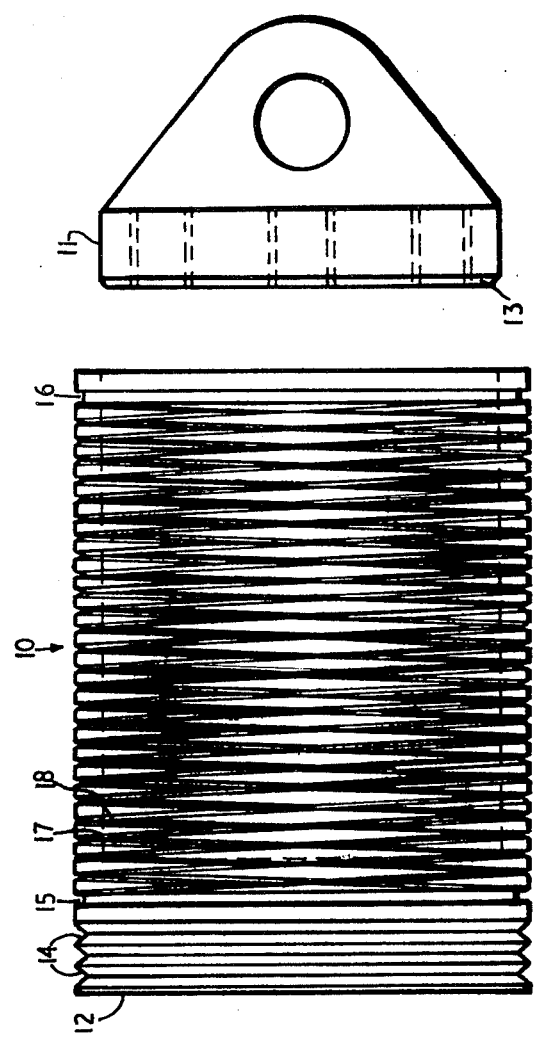

PISTONS

The present invention relates to pistons such as are used in internal combustion engines, steam engines, gas engines, air engines, pumps, compressors and the like.

In an internal combustion engine a piston is required to slide freely in the cylinder but must fit sufficiently closely in the cylinder to prevent the passage of the products of combustion between the piston and the cylinder. In almost all practical internal combustion engines this problem has been solved by machining grooves in the surface of the piston which are used to accommodate piston rings, constructed so as to exert an outward resilient force on the wall of the cylinder thus providing a seal with a minimum of friction. The piston itself can thus be manufactured to have a certain amount of clearance with the cylinder this clearance being sealed by the piston ring or piston rings.

The object of the present invention is to provide a piston which can operate effectively without the use of piston rings, with a view to reducing the costs of manufacture while providing a positive or more effective seal.

The specification of Australian Pat. No. 159,548 disclosed a means for retarding fluid flow under pressure and the dissipation of the fluid pressure, in which the fluid travels through right and left hand intersecting helical channels positioned between an inner core and a closely fitting shrouding. It has now been discovered that the principles underlying the invention disclosed in that specification can be applied to the construction of pistons with a view to achieving the objects set out above.

The present invention consists in a piston for an internal combustion engine or compressor wherein the normal piston rings are replaced by right and left hand intersecting helical channels formed on a portion of the surface of the piston wall.

In order that the invention may be better understood and put into practice a preferred form thereof is hereinafter described by way of example with reference to the accompanying drawing which is, a view in elevation of a two-part piston to which the invention has been applied with the parts separated.

The piston 10 is made of a conventional piston material and when assembled has the gudgeon pin block 11 secured within it by means of head recessed set screws or the like passing through the crown 12 of the piston and engaging in hole 13 in the gudgeon pin block 11. The head recessed set screws have been omitted for clarity. Adjacent the crown of the piston three gas retarding grooves 14 are formed; these are V shaped in cross-section and are separated by V shaped lands. The purpose and function of these grooves is described below. Immediately below the gas retarding grooves 14 there is machined an annular rectangular section groove 15, a similar groove 16 being machined near the bottom of the skirt of the piston. Between the grooves 15 and 16 there extend right and left hand intersecting helical channels 17 and 18 which are cut in the wall surface of the piston. The depth and size of the various grooves described above will depend on the size of the piston and the purpose for which it is intended. It will be seen that the piston does not make use of piston rings.

Experimental work in connection with the invention was carried out on a Mark 10 Villiers engine manufactured in 1952 and taken from a rubbish dump in 1959. This engine was originally equipped with a piston having a conventional piston rings and its characteristics were as follows:
Bore: 50mm
Total swept volume: 98cc
Horsepower 1 at 2,000 r.p.m.
Horsepower 1.3 at 3,000 r.p.m.
Cooling System — air cooled.
Magneto — Villier — fly wheel type.

The engine was stripped and the piston removed. A new piston similar to that shown in the accompanying drawing was manufactured having the following characteristics:

1. The gas retarding grooves 14 consisted of V shaped grooves 0.020 inches deep, the grooves being separated by V shaped lands each having a sharp apex.

2. The rectangular grooves 15 was situated 5/32 of an inch from the top of the crown and was 0.030 inches wide and 0.020 inches deep.

3. The right and left hand intersecting helical channels were of 3/32 inch pitch machined to a depth of 0.015 inches, each channel being of Whitworth form.

4. The circular groove 16 was situated one-eighth of an inch from the edge of the skirt of the piston and was 0.030 inches wide and 0.020 inches in depth.

5. The start and finish of the right and left hand intersecting helical channels was in the grooves 15 and 16.

The engine was run for approximately 60 hours using the piston described above and at the end of this period was tested on a dynamometer with the following results:

| 3400 | RPM | 1.40 | HP |
| 3000 | RPM | 1.35 | HP |
| 2800 | RPM | 1.29 | HP |
| 2500 | RPM | 1.22 | HP |
| 1800 | RPM | 0.83 | HP |
| 1500 | RPM | 0.64 | HP |

It will be seen that the horsepower output obtained slightly exceeded the nominal horsepower despite the age and condition of the engine. During the 60 hours running the oil consumption of the engine was negligible.

After the dynomometer tests the engine was stripped and the following information recorded.
1. Bore diameter: 2.003 inches
2. Piston diameter: 1.9995 inches The arrangement described above is believed to function in the following manner however no particular reliance is to be placed on the correctness of this explanation. In operation lubricating oil from the crank case will be trapped by the groove 16 and will pass into the right and left hand intersecting helical channels 17 and 18 and into the groove 50. During the pressures stroke compressed gases produced by combustion in the cylinder head will seek to escape past the grooves 14 and the groove 15. Such gases that do escape will be provided with a path along the channels 17 and 18. For the gases to pass along the channels they must displace oil contained in the channels and both fluids in their passage through the channels are subjected to interaction and redirection at each intersection of the channels with consequent dissipation and retardation of flow. Thus the escape of gases past the piston will be retarded and if the arrangeent is correctly designed the stroke of the piston will have been completed before oil trapped in the groove 16 is displaced, thus providing an effective seal to prevent the escape of gases past the piston.

The channels function in a similar manner to prevent the ingress of oil from the crank case into the combustion chamber.

The right and left hand intersecting helical grooves or channels ensure lubrication of the piston during movement and the entrapment of oil in the said intersecting helical grooves or channels forms a positive seal of the piston. Without the oil, the right and left hand grooves or channels act only as a flow retarder to the gases, not becoming a positive seal until at least the lower region of the piston skirt receives the oil from splash or forced lubrication. The upper circumferential groove or channel forms a reservoir of displacement fluid being escaping gases, the products of combustion and lubricant and that at the lower end forms a reservoir for lubricant to ensure even distribution of lubricant to the helical grooves or channels.

The provision of a number of grooves separated by a land or lands having a V shaped cross-section with a sharp apex has been found advantageous in preventing the escape of gas from the combustion chamber, in that, if the portion of the piston in which the grooves are formed is made a close fit in the cylinder, when the parts are cold, thermal expansion of the crown of the piston, which is the hottest part of the piston, when the engine is running will press the apices of the lands against the wall of the cylinder and they will adjust themselves to the conditions existing. The sharp edge of the lands will avoid any likelihood of seizure, and no wear from thermal expansion will occur and there will be a minimum of clearance between the part of the piston adjacent the crown and the cylinder wall.

While the form of the invention illustrated in the accompanying drawing shows a two part piston the invention may be applied equally to a piston made in one piece or in more than two pieces, the essential features of the construction being the same.

The invention may be applied to air compressors or devices in which the flow retarding the dissipating action of the intersecting right and left hand helical channels formed on the piston surface in conjunction with splash or forced lubrication of the piston skirt is sufficient to effect a seal to prevent the escape of gas past the piston.

I claim:

1. A piston for use in an internal combustion engine or compressor without piston rings, said piston having as a sealing means a pair of circumferential grooves formed in the external surface of the piston, said grooves being spaced apart axially and being interconnected by right and left hand intersecting helical channels formed on the external surface of the piston, said grooves and channels being adapted to trap and retain lubricating oil, and a plurality of grooves in a plane perpendicular to the axis of the piston separated by at least one land having a sharp apex formed in the external surface of the piston, provided at one end of said piston wherein the diameter of the piston at the apex being substantially the same as the maximum diameter of the piston between the pair of grooves.

* * * * *